(No Model.)
L. R. FAUGHT.
METAL BORING BIT.
No. 327,148. Patented Sept. 29, 1885.
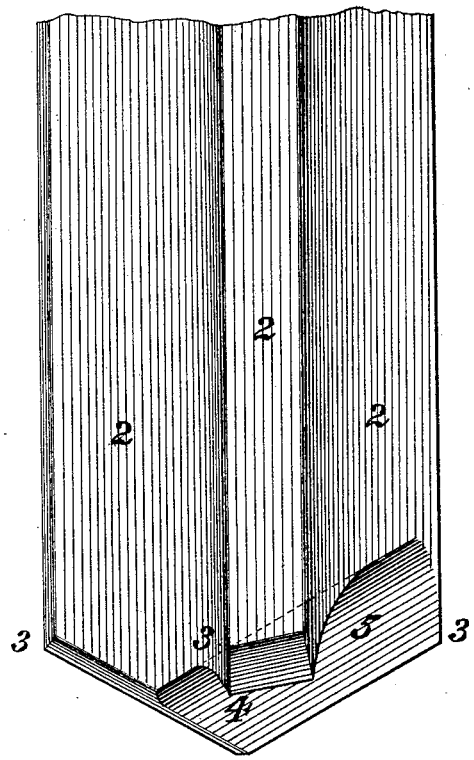
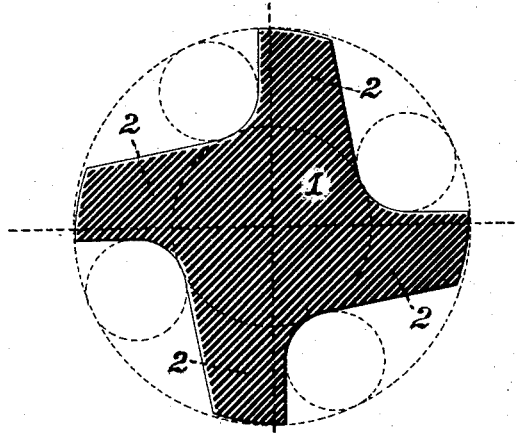
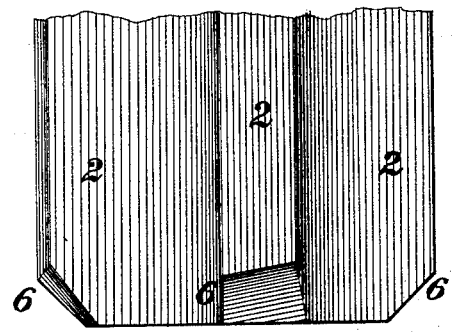
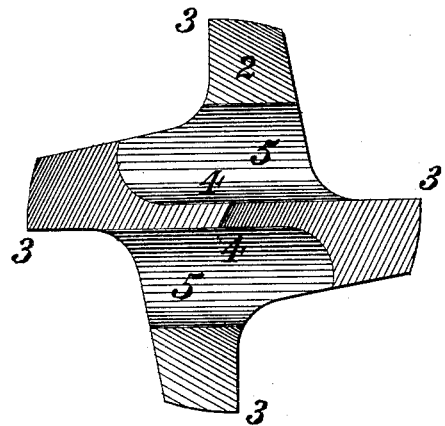
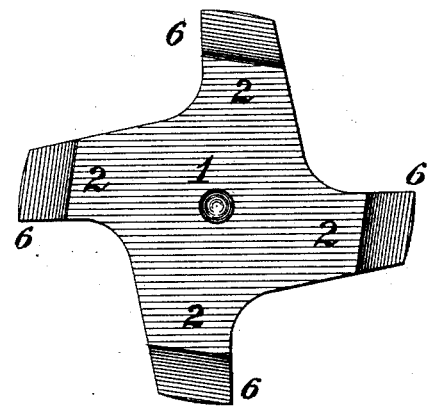
WITNESSES:
R. H. Whittlesey
C. W. Clarke
INVENTOR,
L. R. Faught,
BY Snowden Bell,
ATTORNEY.

UNITED STATES PATENT OFFICE.

LUTHER R. FAUGHT, OF PHILADELPHIA, PENNSYLVANIA.

METAL-BORING BIT.

SPECIFICATION forming part of Letters Patent No. 327,148, dated September 29, 1885.

Application filed October 22, 1884. (No model.)

*To all whom it may concern:*

Be it known that I, LUTHER R. FAUGHT, of the city and county of Philadelphia, in the State of Pennsylvania, have invented certain new and useful Improvements in Continuous Cutters for Drilling and Boring Metal, of which the following is a specification.

The object of my invention is to provide a cutter having a series of continuous cutting blades or wings integral with a central supporting-bar and presenting four or more cutting-edges adapted to work at equal distances apart, both diametrically and circumferentially, said cutter being of such transverse section as to possess a high degree of strength relatively to its sectional area, to afford easy clearance for chips, and to have its cutting-edges so located as to act upon the metal without the undue friction and loss of useful effect resultant upon a scraping cut thereon.

To this end my invention, generally stated, consists in a cutter having four or more continuous ribs or wings projecting from and formed in one piece with a central bar or core, each of said wings having a cutting-edge upon one side of its outer face and the major part of its thickness located on the opposite side of a plane which is radial to the axis of the central bar. The improvements claimed are hereinafter fully set forth.

In the operation of forming holes of circular transverse section in metals three classes of tools are employed—to wit, cutters, reamers, and drills—each being suited to a special description of work, the general character of which determines the kind of tool most appropriately applicable—thus, for example, where it is required to form a circular hole in a solid body of metal a pointed lip-drill working outwardly from an axial line must be used, and where holes already formed, as by coring or otherwise, are to be enlarged and trued out to a circular section, flat cutters or reamer-drills are ordinarily employed, such tools performing their work on the outer edges, while their central portions are unemployed otherwise than as supporting members. Where boring is effected by means of flat cutters, rapidity and accuracy in the performance of the work is promoted by the application of the simultaneous action of two or more cutting-edges—as by two cutters having four edges—the distribution of duty between a series of cutting-edges enabling a correspondingly quicker feed to be imparted to the cutters and the division of the strain circumferentially upon the metal attaining a closer approximation to absolutely accurate circular section in the finished hole than would be the case if a single cutting-edge were employed. Cutters of such character are secured in and carried by a boring-bar or stock, which can be either held stationary while the work is rotated or be fitted to rotate in the axial line of the hole to be bored, and which may be supported either at one or at both ends, as convenience of operation or the requirements of the work may dictate. Instances of quadruple-edged cutters mounted in boring bars, as above referred to, are exemplified in Letters Patent of the United States Nos. 241,481, 253,523, and 302,831, granted and issued to me under dates of May 17, 1881, February 14, 1882, and July 29, 1884, respectively, the boring-bar in the first and third cases projecting from a spindle and being unsupported at the end adjacent to the cutters, and in the second being adapted to be supported at or near each of its ends by bearings located on opposite sides of the cutters and the metal upon which they operate.

The above, and other approved constructions of the same general class, are more particularly intended for and advantageously adaptable to the boring of holes of diameters sufficiently great to admit of the cutters being mounted in bars of diameter and strength adequate to resist the torsional and lateral strains which they sustain in the boring operation, as also to afford a reasonably free escape for the chips from the edges of the cutters. In holes of comparatively small diameter, however, it becomes difficult if not impracticable to preserve the desired conditions of strength and stability in the boring-bar, and increased cramping and resistance to the escape of chips ensues by reason of the relation of the relatively-shorter radius of the hole in the metal to the edge of the cutter acting upon it.

My present invention is specially designed to obviate the practical objections above referred to in the boring of small holes, while retaining the advantageous features due to the employment of a series of cutting-edges in a tool which is simple and inexpensive in its construction and effective and durable in operation.

In the accompanying drawings, Figure 1 is a side view in elevation of a portion of a continuous cutter embodying my invention and having a lip-drill formed upon its lower end; Fig. 2, an end view of the same; Fig. 3, a transverse section; Fig. 4, a side view in elevation with the lower end ground to proper form for the use of the tool as a boring-cutter, and Fig. 5 an end view of the cutter when formed as in Fig. 4.

To carry out my invention, I take a bar of steel of any desired convenient length and forge the same by hammering it while hot, between swages or dies, into a multiple-edged cutter, which is in the form of a central bar or stem, 1, having four or more outwardly-projecting longitudinal ribs or wings, 2, spaced equally around its axial line, with their outer faces at substantially equal distances therefrom. The shape and dimensions of the swages employed are such as to produce a cutter, the transverse section of which, when finished, is clearly exemplified in Fig. 3, its shape being in accordance with the following general rule: The diameter of the central bar, 1, is equal, as nearly as may be, to one-half the diameter of the circumscribing-circle of the finished cutter. The number of wings 2 is even, (four or more,) and the leading sides of each pair of diametrically-opposite wings—that is to say, those on which the cutting-edges are formed—are located on opposite sides of and at equal distances, less than half their thicknesses, from a diameter of the cutter, so that in lieu of being divided centrally by planes radial to the axis of the bar, as heretofore, the major portion of the thickness of each wing shall be in rear of a radial plane which is substantially parallel to its leading side. Further, while the major portion of the thickness may be increased more or less in the judgment of the constructor, the minor portion will vary proportionately to varying diameters of cutters, in each case being regulated to conform to one-half the thickness necessary to form the drill-points, hereinafter referred to. By such arrangement of the metal of the wings the escape of chips is greatly facilitated, and the presentation of the cutting-edges to the metal operated on is effected with greatly-decreased tendency to induce a scraping cut thereon. The wings are strengthened at their roots by fillets curved to segments of circles of about one-fourth the diameter of the circumscribing circle, each of which fillet-curves is tangential to the leading side of one wing and the following side of the next preceding wing.

After being forged to the form above described, which operation is preferably performed upon a bar of sufficient length to be divided into a series of separate and similar cutters, the forged piece is cut into desired lengths, which are finished by turning or grinding, between centers in their ends, to the required diameter, and relieving the outer faces from their front toward their rear sides, to afford proper draft or clearance. The wings may be either parallel throughout their length to the axis of the cutter, as shown, or may be twisted spirally about the same, as in twist-drills, and while they are preferably continuous throughout the length of the cutter a portion or portions of the same may, if desired, be forged to cylindrical or polygonal form, to enable the cutters to be readily fitted in sockets or chucks of ordinary construction and of established sizes.

A cutter forged and finished to the form above described is adaptable to use as a drill, a boring-cutter, a reamer, or a tap, accordingly as its end or the face of its wings may be dressed to meet the respective requirements of said tools. Figs. 1 and 2 illustrate the cutter ground to serve as a lip-drill, which presents four cutting-edges, 3, for acting upon the outer diameter of the hole where the material to be removed is greatly in excess of that at the center, combined with two central cutting-edges, 4, which are arranged in proper location to cut easily into the metal. The drill is formed by first beveling the wings at the end of the cutter to an angle of about thirty degrees, and thereafter cutting out two segmental recesses, 5, parallel with the drill-lips, said recesses passing completely through the two other wings, so as to sever the connection of the four wings at the center, leaving a central drill-point of the desired bevel, from which the recesses 5 afford free passage for the chips, while the four wings all act as cutters, working substantially on the same plane on the outer diameter. The beveled edges are ground by the ordinary processes used for drills, while the recesses 5 may be formed by special round-faced corundum or emery wheels, suitably arranged for the purpose.

In Figs. 4 and 5 the tool is shown as adapted to use as a boring-cutter, in which case the wings are ground at their ends to inclined faces 6, acting in the same plane upon the outer diameter of the hole to be bored. It will also be obvious that the cutters may serve for reamers, and, when properly threaded, for screw-taps, and in such case possess material advantages over tools of such character made, as is ordinarily the case, by milling out a solid bar, for the reason that when worn below standard they may be enlarged several times by reswaging, and being thereafter tempered and ground to the desired standard, and when so far reduced that this operation cannot be repeated they may be forged down to smaller diameter, one or more times, and used until exhausted. The sharpening of the tools is effected by grinding continuously off the end, as periodically required.

The formation of the cutter by forging to the desired form not only effects a substantial economy of metal in avoiding the waste of about one-third of the stock, which would be involved in milling out the spaces between the wings, but also produces cutting-surfaces of better quality and durability, for the reason that the action of the hammer or dies effects a uniform arrangement of the grain of the metal around the surfaces of the wings practically vertically thereto, cross-grained sections being avoided, and thus the grain being presented under the most favorable conditions attainable for exerting effective cutting action.

I am aware that cutters and drills having a series of wings formed in one piece with a central body have been known prior to my invention, and such, therefore, I do not broadly claim.

I claim as my invention, and desire to secure by Letters Patent—

1. A forged-steel cutter having four or more cutting wings or ribs formed in one piece with and projecting from a central bar or body, each of said wings having a cutting-edge upon one side of its outer face and the major portion of its thickness located upon the opposite side of a plane which is radial to the axis of the bar and substantially parallel to the front or leading side of the wing, substantially as set forth.

2. A forged-steel cutter having four cutting wings or ribs formed in one piece with and projecting from a central body, each having an outer cutting-edge and being disposed unequally on opposite sides of a plane radial to the axis of the body, said cutter having its end beveled to form two drilling-lips, each parallel to the other and to a segmental recess cut through one of the wings adjacent to its end, substantially as set forth.

LUTHER R. FAUGHT.

Witnesses:
 CHAS. E. PANCOAST,
 GEORGE ROBINSON.